(12) United States Patent
Beniya et al.

(10) Patent No.: US 11,872,755 B2
(45) Date of Patent: Jan. 16, 2024

(54) METHOD FOR MANUFACTURING PRODUCT, AND ADDITIVE MANUFACTURING APPARATUS

(71) Applicant: CANON KABUSHIKI KAISHA, Tokyo (JP)

(72) Inventors: Yoshiyuki Beniya, Abiko (JP); Kota Kiyohara, Yokohama (JP); Hitoshi Murao, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 458 days.

(21) Appl. No.: 16/860,166

(22) Filed: Apr. 28, 2020

(65) Prior Publication Data
US 2020/0361147 A1    Nov. 19, 2020

(30) Foreign Application Priority Data

May 16, 2019   (JP) .................................. 2019-093109
Apr. 14, 2020   (JP) .................................. 2020-072235

(51) Int. Cl.
| | | |
|---|---|---|
| *B29C 64/393* | (2017.01) | |
| *B29C 64/245* | (2017.01) | |
| *B29C 64/214* | (2017.01) | |
| *B29C 64/153* | (2017.01) | |
| *B33Y 10/00* | (2015.01) | |
| *B33Y 30/00* | (2015.01) | |

(Continued)

(52) U.S. Cl.
CPC ............ *B29C 64/245* (2017.08); *B22F 10/14* (2021.01); *B22F 10/28* (2021.01); *B22F 10/30* (2021.01);

(Continued)

(58) Field of Classification Search
None
See application file for complete search history.

(56) References Cited

U.S. PATENT DOCUMENTS 10,213,966 B2 *   2/2019   FrantzDale ............. B29C 64/00
11,161,303 B2 *  11/2021  Markwalder ......... B29C 64/379
(Continued)

FOREIGN PATENT DOCUMENTS

EP          3597407 A1 *  1/2020  ............. B22F 10/20
JP       2015-155188 A     8/2015
(Continued)

OTHER PUBLICATIONS

Han C, Printing bottom plate fixing device and a 3 D printing working table-CN-111805906-A Machine Translation, Oct. 23, 2020, Clarivate Analytics, all (Year: 2023).*

*Primary Examiner* — Joseph S Del Sole
*Assistant Examiner* — Margaret B Hayes
(74) *Attorney, Agent, or Firm* — Venable LLP

(57) ABSTRACT

An additive manufacturing apparatus includes a supporting portion, a powder supplying portion, a flattening member, a curing portion, and a controller. The supporting portion is configured to detachably support a shaping stage. The powder supplying portion is configured to supply powder. The flattening member is configured to move in a scanning manner above the shaping stage attached to the supporting portion. The controller is configured to execute a measuring process of detecting inclination between a shaping surface of the shaping stage attached to the supporting portion and a trajectory plane of a trajectory of scanning movement of the flattening member, an adjustment process of adjusting an orientation of the shaping stage on a basis of a detection result of the measuring process such that a degree of parallel between the shaping surface and the trajectory plane increases, a powder layer formation process, and a curing process.

12 Claims, 14 Drawing Sheets

(51) Int. Cl.
   *B33Y 50/02*   (2015.01)
   *B22F 10/30*   (2021.01)
   *B22F 10/14*   (2021.01)
   *B22F 10/28*   (2021.01)
   *B22F 12/60*   (2021.01)
   *B22F 12/90*   (2021.01)
   *B22F 10/47*   (2021.01)
   *B22F 10/85*   (2021.01)
   *B22F 12/30*   (2021.01)
   *B22F 12/63*   (2021.01)
   *B22F 10/50*   (2021.01)

(52) U.S. Cl.
   CPC .............. *B22F 10/47* (2021.01); *B22F 10/85* (2021.01); *B22F 12/60* (2021.01); *B22F 12/90* (2021.01); *B29C 64/153* (2017.08); *B29C 64/214* (2017.08); *B29C 64/393* (2017.08); *B33Y 10/00* (2014.12); *B33Y 30/00* (2014.12); *B33Y 50/02* (2014.12); *B22F 10/50* (2021.01); *B22F 12/30* (2021.01); *B22F 12/63* (2021.01)

(56) References Cited

U.S. PATENT DOCUMENTS

| | | | | |
|---|---|---|---|---|
| 2002/0104973 A1* | 8/2002 | Kerekes | ................ | B22F 10/22 250/559.2 |
| 2007/0126157 A1* | 6/2007 | Bredt | .................... | B33Y 10/00 425/375 |
| 2012/0007287 A1* | 1/2012 | Vermeer | ............... | B29C 64/194 264/401 |
| 2013/0026680 A1* | 1/2013 | Ederer | .................... | B22F 10/14 425/166 |
| 2013/0108726 A1* | 5/2013 | Uckelmann | ............ | A61C 13/20 425/375 |
| 2015/0183168 A1* | 7/2015 | Liverman | ............. | B29C 64/135 425/166 |
| 2015/0231828 A1* | 8/2015 | El-Siblani | ............. | B29C 64/153 264/109 |
| 2016/0297136 A1* | 10/2016 | Wakabayashi | .......... | B29C 64/00 |
| 2017/0129011 A1 | 5/2017 | Murata et al. | | |
| 2017/0165909 A1* | 6/2017 | Hakkaku | ............... | B29C 64/188 |
| 2017/0232679 A1* | 8/2017 | Gardiner | .............. | B29C 64/118 425/162 |
| 2017/0252806 A1* | 9/2017 | Wienberg | ............. | B29C 64/393 |
| 2017/0371317 A1* | 12/2017 | Share | ..................... | B29C 64/393 |
| 2019/0009469 A1* | 1/2019 | Feeney | ............... | B29C 35/0288 |
| 2019/0134715 A1* | 5/2019 | Stammberger | ........... | B22F 7/08 |
| 2019/0263062 A1* | 8/2019 | Pieger | ...................... | B22F 7/08 |
| 2021/0299955 A1* | 9/2021 | Wolf | ....................... | B22F 12/90 |

FOREIGN PATENT DOCUMENTS

| | | |
|---|---|---|
| JP | 2015-157420 A | 9/2015 |
| JP | 2018-052026 A | 4/2018 |

\* cited by examiner

INITIAL POSITION

METHOD FOR MANUFACTURING PRODUCT, AND ADDITIVE MANUFACTURING APPARATUS

BACKGROUND OF THE INVENTION

Field of the Invention

The present invention relates to a method for manufacturing a product by a so-called powder bed modeling method and to an additive manufacturing apparatus used therefor.

Description of the Related Art

In recent years, so-called 3D printers have been actively developed, and various systems have been attempted therefor. For example, various methods such as fused deposition modeling, stereolithography using photocurable resin, and selective laser sintering are known.

Selective laser sintering is a method of forming a three-dimensionally shaped object by repetitively performing a step of laying a layer of powder such as nylon resin, ceramics, or metal and selectively fusing or sintering part of the powder layer by laser light irradiation. In recent years, as a method of manufacturing a product for which high mechanical strength and high thermal conductivity are required, selective laser sintering using a metal powder as a raw material has been actively used. In addition, there is a method of forming a three-dimensionally shaped object by curing a part of the powder layer by selectively spraying a curing agent thereon and inducing a chemical reaction instead of heating the powder layer by laser light. To be noted, an apparatus and method that perform three-dimensional modeling while laying a layer of powder will be sometimes respectively referred to as a powder bed modeling apparatus and a powder bed modeling method.

Japanese Patent Laid-Open No. 2015-157420 proposes a manufacturing method for manufacturing a three-dimensionally shaped object by layering powder such as metal on a shaping stage and then radiating laser light thereon. Japanese Patent Laid-Open No. 2015-157420 discloses a method of obtaining an object of a predetermined three-dimensional shape by repeating an operation of laying powder to a thickness corresponding to one layer of the three-dimensionally shaped object, then radiating laser light onto only a part of the powder layer to be cured to fuse and solidify the part, and then lowering the shaping stage by an amount corresponding to one layer. Further, Japanese Patent Laid-Open No. 2015-157420 discloses an apparatus including a plurality of light sources that radiates laser light onto a shaping surface of a shaping stage, a detector that detects light reflected on the shaping surface, and an adjuster that adjusts the height of the shaping stage. Further, Japanese Patent Laid-Open No. 2015-157420 discloses that a correction amount related to the height of the shaping surface of the shaping stage is calculated from an irradiation position of the laser light detected by the detector and that the height of the shaping stage is adjusted by operating the adjuster on the basis of the correction amount.

When mass-producing three-dimensionally shaped objects successively by using a powder bed modeling apparatus, the shaping stage for constructing a shaped object is replaced each time a three-dimensionally shaped object is manufactured. Since a plate-like member is often used for the shaping stage, the shaping stage is often also referred to as a shaping plate. However, the shaping stage does not have to have a plate-like shape as long as the shaping stage is attachable to and detachable from a modeling apparatus. The upper surface of the shaping stage serves as a base surface for laying a layer of a raw material powder, and is therefore formed to have a high flatness.

In the apparatus of Japanese Patent Laid-Open No. 2015-157420, to set the height of the shaping stage or the inclination of the upper surface thereof to a predetermined value, the upper surface of the shaping stage is optically detected, the correction amount is calculated, and thus the adjuster is operated to adjust the orientation of the shaping stage. Normally, the orientation of the shaping stage is adjusted such that the upper surface of the shaping stage is horizontal.

Generally, in a powder bed modeling apparatus, a flattening member is moved in a scanning manner above the upper surface of the shaping stage along the upper surface of the shaping stage to flatten the upper surface of the powder layer to improve the flatness of the surface of the powder layer when laying powder of an amount corresponding to one layer on the shaping stage. As the flattening member, for example, a roller, or a thin plate-like member called squeegee or a blade is used, and the surface of the powder layer is flattened along the scanning trajectory of the lower surface of the flattening member. Normally, the operation of a scanning mechanism of the flattening member is initially set such that the scanning trajectory of the lower surface of the flattening member is a horizontal plane.

However, since the flattening member and the upper surface of the shaping stage are separately adjusted to be horizontal in the apparatus of Japanese Patent Laid-Open No. 2015-157420, it is difficult to make adjustment such that the scanning trajectory of the lower surface of the flattening member follows the entire surface of the shaping stage. In the case where there is even a small deviation between the orientation or scanning trajectory of the flattening member and the upper surface of the shaping stage, the upper surface of the shaping stage and the upper surface of the powder layer laid thereon become nonparallel. Therefore, the thickness of, for example, the first powder layer laid on the upper surface of the shaping stage becomes uneven at some spots. When forming a first layer of a three-dimensionally shaped object by radiating laser light, the irradiation energy of the laser light is set on the premise that the powder layer is uniformly formed to have a predetermined thickness. At a spot where the thickness of the layer is smaller than the predetermined thickness, the irradiation energy is too high for the amount of powder, which may cause fusion of a peripheral area of the irradiation position and cause an error in the shape of the shaped object. In addition, at a spot where the thickness of the layer is larger than the predetermined thickness, the irradiation energy is too low for the amount of powder, which may cause insufficient fusion and cause an error in the shape or insufficiency of the curing strength. In particular, since the first layer serves as a base of the three-dimensionally shaped object, it is important to form the first layer with a high shape precision to have a predetermined strength to stably proceed formation of upper layers to be subsequently performed.

Therefore, an additive manufacturing apparatus or a method for manufacturing a three-dimensionally shaped object that enables adjusting the degree of parallel between the upper surface of the shaping stage and a plane drawn by the scanning trajectory of the lower surface of the flattening member and forming a powder layer of a uniform thickness on the shaping stage is desired.

SUMMARY OF THE INVENTION

According to a first aspect of the present invention, a method for manufacturing a product by using an additive manufacturing apparatus includes a measuring process in which the controller detects inclination between the shaping surface and a trajectory plane of a trajectory of scanning movement of the flattening member, an adjustment process in which the controller adjusts an orientation of the shaping stage on a basis of a detection result of the measuring process such that a degree of parallel between the shaping surface and the trajectory plane increases, a powder layer formation process in which the controller causes the powder supplying portion to supply the powder after the adjustment process and causes the flattening member to perform the scanning movement above the shaping stage to lay the powder layer, and a curing process in which the controller causes the curing portion to selectively cure the powder layer. The additive manufacturing apparatus includes a supporting portion configured to support a shaping stage comprising a shaping surface, a powder supplying portion configured to supply powder, a flattening member configured to move in a scanning manner above the shaping stage attached to the supporting portion, a curing portion configured to selectively cure a powder layer laid on the shaping stage, and a controller.

According to a second aspect of the present invention, an additive manufacturing apparatus includes a supporting portion configured to detachably support a shaping stage comprising a shaping surface, a powder supplying portion configured to supply powder, a flattening member configured to move in a scanning manner above the shaping stage attached to the supporting portion, a curing portion configured to selectively cure a powder layer laid on the shaping stage, and a controller. The controller is configured to execute a measuring process of detecting inclination between the shaping surface of the shaping stage attached to the supporting portion and a trajectory plane of a trajectory of scanning movement of the flattening member, an adjustment process of adjusting an orientation of the shaping stage on a basis of a detection result of the measuring process such that a degree of parallel between the shaping surface and the trajectory plane increases, a powder layer formation process of causing the powder supplying portion to supply the powder after the adjustment process and causing the flattening member to perform the scanning movement above the shaping stage to lay the powder layer, and a curing process of causing the curing portion to selectively cure the powder layer.

Further features of the present invention will become apparent from the following description of exemplary embodiments with reference to the attached drawings.

DESCRIPTION OF THE EMBODIMENTS

An additive manufacturing apparatus and a method for manufacturing a three-dimensionally shaped object serving as embodiments of the present invention will be described with reference to drawings. To be noted, when a positional relationship or a direction is mentioned in the description below, an "upper side" refers to the upper side in the gravity direction and a "lower side" refers to the lower side in the gravity direction unless otherwise described.

First Exemplary Embodiment

Configuration of Additive Manufacturing Apparatus

In the present exemplary embodiment, although a powder bed modeling apparatus of a system that lays a layer of metal powder and sintering the metal powder by energy of laser light will be described as an example of an additive manufacturing apparatus, application of the present invention is not limited to this system.

Figure 1A:
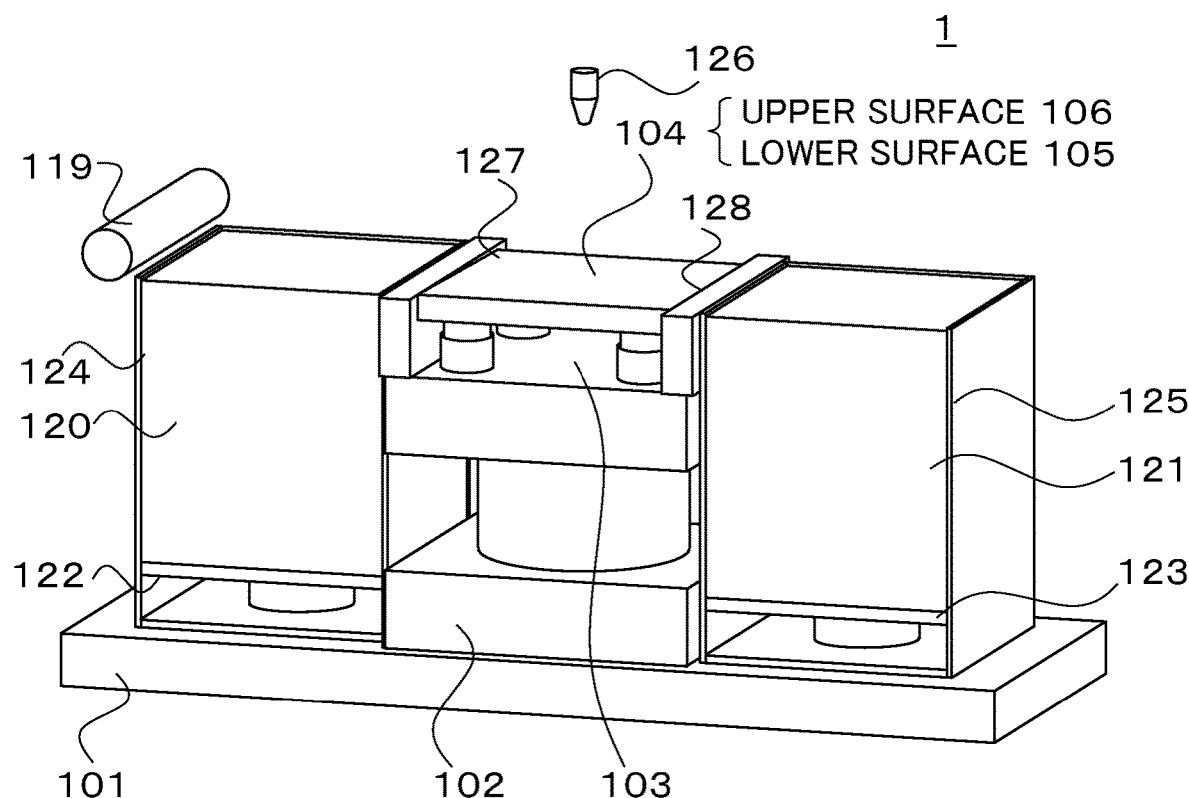
FIG. 1A is a perspective view of an additive manufacturing apparatus according to a first exemplary embodiment illustrating a configuration thereof.

FIG. 1A is a schematic perspective view of an additive manufacturing apparatus according to a first exemplary embodiment illustrating a schematic configuration thereof. A powder bed modeling apparatus 1 includes a platform portion 101 serving as a base portion in contact with a floor surface, and an elevator stand 102 and material elevators 122 and 123 are provided on the platform portion 101.

An upper surface 103 of the elevator stand 102 is kept horizontal, and can be moved up and down along the vertical direction by an unillustrated driving mechanism. To be noted, the terms "horizontal" and "vertical direction" used herein are not so strict as to not allow even a minute error.

Figure 1B:
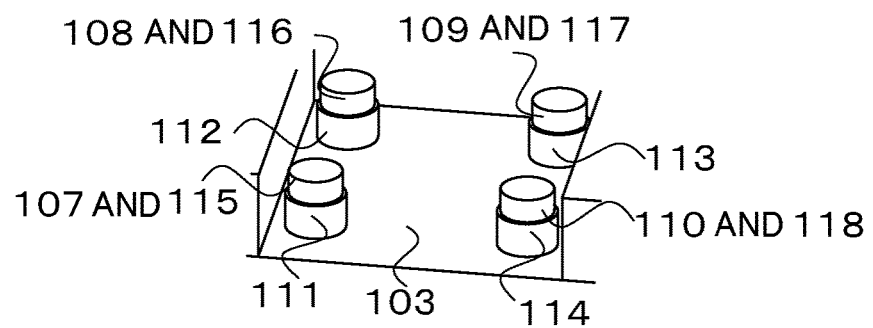
FIG. 1B is an enlarged view of a mechanism that supports a shaping plate according to the first exemplary embodiment.

FIG. 1B is a schematic diagram illustrating arrangement of members provided on the upper surface 103. Adjusters 111, 112, 113, and 114 serving as adjustment portions capable of expanding and contracting in the vertical direction and thus adjusting the length thereof in the vertical direction are provided on the upper surface 103. Elastic supporting members 107, 108, 109, and 110 are provided respectively on the adjusters 111 to 114. The elastic supporting members 107 to 110 are members that elastically support a shaping plate 104 serving as a shaping stage, and are sometimes also referred to as elastic shoes. A lower surface 105 of the shaping plate 104 is detachably fixed to, that is, attached to the elastic supporting members 107 to 110 that are elastically deformable.

In the present exemplary embodiment, the adjusters and the elastic supporting members are aligned in series in the vertical direction at four positions on the upper surface 103 of the elevator stand 102. As a result of this, four corners of the shaping plate 104 are each elastically supported, and the height of each of the four corners in the up-down direction can be adjusted. To be noted, although the orientation of the shaping plate 104 can be defined by just providing the adjusters and the elastic supporting members at three positions on the upper surface 103 of the elevator stand 102 in principal, it is preferable that these are provided at four positions in view of the stability and adjustment precision of the orientation. Adjusters and elastic supporting members may be aligned in series at five or more positions on the upper surface 103 of the elevator stand 102 such that the shaping plate 104 can be supported more stably and with higher precision.

The elastic supporting members 107 to 110 each elastically deform in accordance with a received force, and each include a length meter serving as a measuring portion that measures change in the length thereof in the vertical direction derived from the elastic deformation. The elastic supporting members 107 to 110 respectively include length meters 115, 116, 117, and 118.

Referring back to FIG. 1A, the powder bed modeling apparatus 1 includes a roller 119 for laying a layer of a powder material serving as a raw material of the three-dimensionally shaped object on the shaping plate 104 and flattening the upper surface of the layer. The roller 119 is capable of reciprocating above the shaping plate 104 in the horizontal direction by an unillustrated driving mechanism. To be noted, the horizontal direction mentioned herein is not so strict as to not allow even a minute error. Influence of the error on the modelling is negligible if the difference between positions of the four corners of the shaping plate 104 in the gravity direction is equal to or smaller than 30 μm. Therefore, in the present exemplary embodiment, inclination of the four corners of the shaping surface of the shaping plate 104 small enough to fall within the range described above is regarded as horizontal.

The material elevators 122 and 123 serving as powder supplying portions store powder materials 120 and 121 each serving as a raw material for the additive manufacturing. A range in which the roller 119 is capable of reciprocating covers a region from an end portion 124 of the powder material 120 on the side farther from the shaping plate 104 to an end portion 125 of the powder material 121 on the side farther from the shaping plate 104.

In addition, the powder bed modeling apparatus 1 includes, as a curing portion, a laser emission apparatus 126 that selectively heats the powder material laid on the shaping plate 104 to sinter the powder material at a high temperature. The laser emission apparatus 126 serving as an energy beam radiation portion includes a laser light source, a scanning optical system for performing scanning with a laser beam, and so forth. Although a fiber laser of a wavelength of 1070 nm having a maximum output of 500 W is used as a laser light source in the present exemplary embodiment, the laser light source is not limited to this, and a laser light source of a different wavelength or different system may be employed. The scanning optical system can be constructed by using, for example, a galvano scanner and a condensing lens for condensing and performing scanning with the laser beam emitted from the laser light source.

Figure 2:
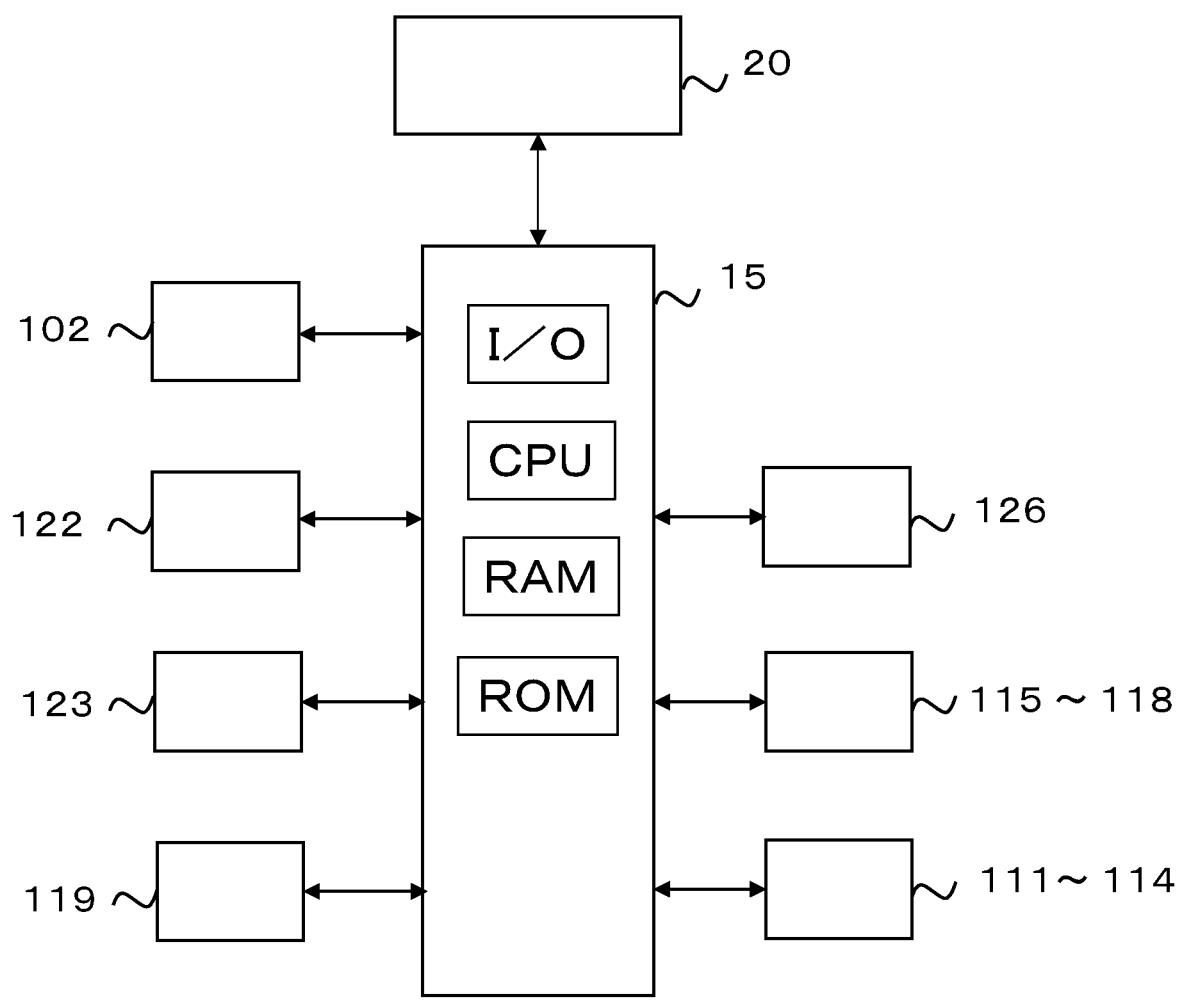
FIG. 2 is a control block diagram of the additive manufacturing apparatus according to the first exemplary embodiment.

FIG. 2 is a control block diagram of the powder bed modeling apparatus 1. A controller 15 is a computer for controlling the operation of the powder bed modeling apparatus 1, and includes a central processing unit: CPU, a read-only memory: ROM, a random-access memory: RAM, an input/output port: I/O port, and so forth therein. The ROM serving as a computer-readable recording medium stores an operation program for the powder bed modeling apparatus 1. The I/O port is connected to an external device, a network, and the like, and is capable of, for example, performing input/output of data required for additive manufacturing from/to an external computer 20. The data required for additive manufacturing include shape data of the three-dimensionally shaped object to be manufactured, information of a material used for the manufacture, and modeling shape data of each layer, that is, slice data. Although the slice data is generated by the CPU in the controller 15 on the basis of the shape data of the shaped object and is recorded in the RAM, the slice data may be received from the external computer 20 and stored in the RAM.

The controller 15 is connected to the elevator stand 102, the material elevators 122 and 123, the roller 119, the laser emission apparatus 126, the length meters 115 to 118, the adjusters 111 to 114, and so forth via signal lines, and is capable of executing processing related to modeling by controlling the operation of each component.

Operation of Additive Manufacturing Apparatus

Next, the operation of the powder bed modeling apparatus 1 serving as the first exemplary embodiment will be described. In the description below, the operation of adjusting the orientation of the shaping plate and the additive manufacturing operation will be described in detail.

Operation for Adjusting Orientation of Shaping Plate

When the shaping plate 104 is connected to and attached to the elastic supporting members 107 to 110, the powder bed modeling apparatus 1 measures whether or not the upper surface 106 of the shaping plate 104 is inclined with respect to the movement trajectory of the bottom end of the roller 119 before laying a layer of the powder material. That is, the controller executes a measuring process of detecting or measuring the inclination between the shaping surface and the trajectory plane of the scanning movement of the flattening member. As a result of the measurement, in the case where it has been found that the shaping surface is inclined with respect to the movement trajectory of the bottom end of the roller 119, the orientation of the shaping plate 104 is adjusted such that these two become parallel. That is, the controller executes an adjustment process of adjusting the orientation of the shaping stage such that the degree of parallel between the shaping surface and the trajectory plane of the scan by the flattening member increases. In other words, the controller executes an adjustment process of making adjustment such that the angle difference between the shaping surface and the trajectory plane of the scan by the flattening member decreases.

Figure 3:
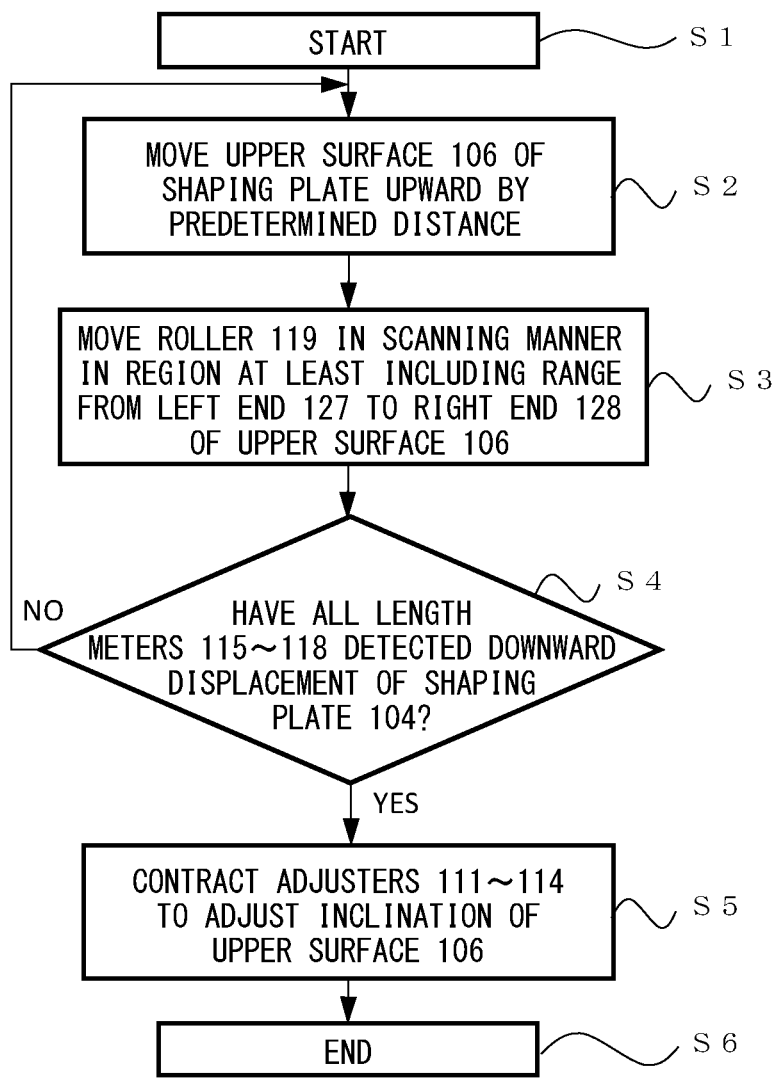
FIG. 3 is a flowchart of an adjustment operation of an inclination angle according to the first exemplary embodiment.

FIG. 3 is a flowchart illustrating a procedure of the operation of adjusting the orientation of the shaping plate.

The operation is started in step S1, and then in step S2, the controller 15 operates the driving mechanism of the elevator stand 102 to move the shaping plate 104 upward by a predetermined amount as compared to a case of forming a powder layer serving as a first layer. In the case of the present exemplary embodiment, the predetermined amount is, for example, 10 μm.

Next, in step S3, the roller 119 is caused to move in a scanning manner in a region including a range from a left end 127 to a right end 128 of the upper surface 106 of the shaping plate 104 illustrated in FIG. 1A. The roller 119 is caused to perform the scanning movement by controlling the driving portion of the roller 119 such that the bottom end of the roller 119 draws the same trajectory as in the case of forming a powder layer. From the start to the end of the scanning movement, the controller 15 monitors the change in the length of each elastic supporting member in the vertical direction measured by each of the length meters 115 to 118.

Next, in step S4, the controller 15 checks, on the basis of the measurement results of the length meters 115 to 118, whether or not the roller 119 has contacted the entirety of the upper surface 106 of the shaping plate 104. This is because the inclination of the upper surface 106 with respect to the movement trajectory of the bottom end of the roller 119 cannot be measured with high accuracy unless the roller 119 is in contact with the upper surface 106 all the time while the roller 119 is performing the scanning movement. In other words, the controller 15 determines whether or not all the elastic supporting members 107 to 110 have elastically deformed during the scanning movement and all the length meters 115 to 118 have detected downward displacement of the shaping plate 104.

When the roller 119 comes into contact with the shaping plate 104, part or all of the elastic supporting member 107 to 110 receive downward force in the vertical direction and elastically deform, the shaping plate 104 is displaced downward, and the displacement is measured by the length meters 115 to 118. To be noted, the amount of elastic deformation of each elastic supporting member changes in accordance with the position of the roller 119 during the scanning movement. For example, the downward displacement measured by the length meter 115 of the elastic supporting member 107 takes a local maximum when the roller 119 is in contact with the upper surface 106 at a position right above the elastic supporting member 107. In other words, each position on the upper surface 106 is displaced to the lowest point during the scan when the position is in contact with the roller 119. Then, when the scanning movement to the right in FIG. 1A progresses such that the roller 119 moves to a position on the right side of the right end 128 of the upper surface 106, the roller 119 is separated from the upper surface 106, and therefore all the elastic supporting members 107 to 110 are released from the pressing force from the roller 119. Therefore, after the measurement is finished, the elastic supporting members having elastically deformed are gradually restored to the original length, and the shaping plate 104 shows a behavior of returning to the original position of the time before the scanning movement of the roller 119.

Here, depending on the inclination angle of the upper surface 106 of the shaping plate 104 with respect to the trajectory of the bottom end of the roller 119, a case where part of the upper surface 106 does not contact the roller 119 even when the roller 119 is caused to perform the scanning movement and part of the four corners of the upper surface 106 is not displaced downward may arise. In this case, the result of determination in step S4 is NO, therefore the process returns to step S2 to move the shaping plate 104 further upward by 10 μm, and steps S3 and S4 are repeated.

As described above, even in the case where the result of step S4 is NO, after repeating the loop of steps S2 to S4, a state where the roller 119 is in contact with the upper surface 106 of the shaping plate 104 all the time during the scanning movement is reached. Then, when all the length meters 115 to 118 indicate downward displacement, the result of step S4 becomes YES, and the process proceeds to step S5.

In step S5, the adjusters 111 to 114 are contracted to adjust the orientation of the shaping plate 104 such that the upper surface 106 of the shaping plate 104 becomes parallel to the movement trajectory of the bottom end of the roller 119. The amount of contraction of the adjusters 111 to 114 are set to be equal to the local maximum values of the measurement values of the length meter 115 to 118 when "YES" determination is made in step S4. That is, the adjuster 111 is contracted by a length equal to the local maximum value of the contraction amount measured by the length meter 115 during the scanning movement of the roller 119. Similarly, the adjusters 112, 113, and 114 are contracted by lengths equal to the local maximum values of the contraction amounts measured by the length meters 116, 117, and 118 during the scanning movement of the roller 119, respectively.

After the operation of the adjusters 111 to 114 is completed, the orientation adjustment operation is finished in step S6. Since the elastic supporting members 107 to 110 having elastically deformed have restored to the original length and the adjusters 111 to 114 have been contracted by lengths equal to the local maximum values of the contraction amounts of the elastic supporting members 107 to 110, the upper surface 106 has been adjusted such that the degree of parallel between the upper surface 106 and the movement trajectory of the bottom end of the roller 119 is high. In other words, adjustment has been made to reduce the angle difference between the shaping surface and the trajectory plane of the scanning movement of the flattening member.

As described above, when measuring whether or not the upper surface 106 of the shaping plate 104 is inclined with respect to the movement trajectory of the bottom end of the roller 119, the height of the shaping plate 104 is adjusted before laying a layer of a powder material, such that the upper surface 106 comes into contact with the bottom end of the roller 119. That is, measurement is performed such that the roller 119 moves along the upper surface 106 in a state in which contact between the bottom end of the roller 119 and the upper surface 106 of the shaping plate 104 is maintained. Since a position on the upper surface 106 where the bottom end of the roller 119 is in contact therewith receives a downward pressing force, the elastic supporting members 107 to 110 supporting the shaping plate 104 deform in accordance with movement of the roller 119. By measuring the change in the lengths of the elastic supporting members 107 to 110 by using the length meters 115 to 118, whether or not the upper surface 106 of the shaping plate 104 is inclined with respect to the movement trajectory of the bottom end of the roller 119 can be measured. Further, by adjusting the lengths of the adjusters 111 to 114 in the vertical direction on the basis of the measurement results, the inclination between the upper surface 106 of the shaping plate 104 and the movement trajectory of the bottom end of the roller 119 can be reduced to increase the degree of parallel therebetween.

In the present exemplary embodiment, an elastic modulus k [N/mm] of the elastic supporting members 107 to 110 is set in the following range. What each parameter in the formula represents will be described later.

$$\frac{\Delta mg}{4\Delta b_e} \le k \le \delta_e \frac{3EIL^3}{\Delta h a^3 b^3}$$

To be noted, a [mm] and b [mm] are respectively expressed as follows.

$$a = \frac{L}{2} + \frac{S}{2}$$
$$b = \frac{L}{2} - \frac{S}{2}$$

Next, a procedure for obtaining the range of k will be described. First, the lower limit value expressed by the left half of the inequality will be described.

In deposition modeling, each time the powder material for one layer is deposited, the elastic supporting members 107 to 110 are displaced downward due to the mass thereof, and it is required to suppress the downward displacement to a certain degree or less to maintain the quality of the manufactured product. Downward displacement Δb [mm] is obtained as follows.

When Δz [mm] represents the thickness of one layer in the deposition modeling, A [mm²] represents the area of the upper surface 106 of the shaping plate 104, and ρ [g/cm³] represents the material density, a material mass Δm [kg] of one layer is expressed as follows.

$$\Delta m = \Delta z A \rho \times 10^{-6}$$

When g [mm/s²] represents the gravitational acceleration, the following holds in accordance with equilibrium of forces.

$$\Delta mg = 4k\Delta b$$

The right term of the formula above is multiplied by 4 because the shaping plate 104 is supported by four elastic supporting members.

Then, the following formula is obtained by solving the formula above for Δb.

$$\Delta b = \frac{\Delta mg}{4k}$$

The following formula is obtained by replacing Δb of the formula above by Δba representing an allowable value thereof and solving the formula for k. As a result of this, the lower limit value of k is defined.

$$\frac{\Delta mg}{4\Delta b_e} \le k$$

Next, the upper limit value of the range of k will be described.

When the roller 119 comes into contact with the upper surface 106 of the shaping plate 104 in step S3 of FIG. 3 described above, if the elastic modulus of the elastic supporting members 107 to 110 is too large, the bending deflection of the roller 119 increases, and the precision of adjustment of the inclination angle of the upper surface 106 is degraded. Therefore, the upper limit value of k needs to be defined such that the amount of bending deflection of the roller 119 is within an allowable range.

Figure 4:
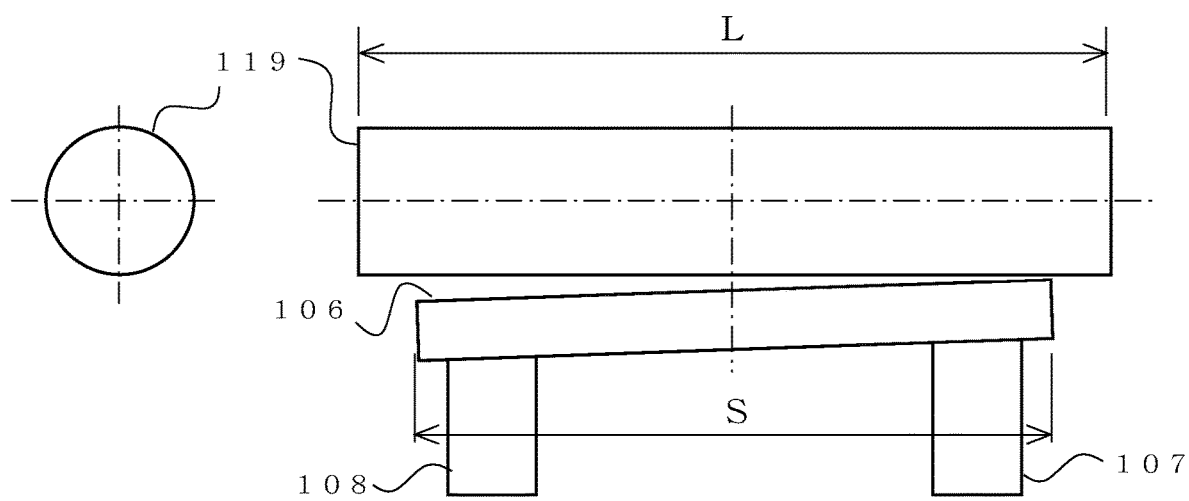
FIG. 4 is a diagram illustrating an example of one state of the adjustment operation of the inclination angle according to the first exemplary embodiment.

The amount of lift of the upper surface 106 in step S2 of FIG. 3 described above is denoted by Δh [mm]. Here, it is assumed that the roller 119 comes into contact with a corner supported by the elastic supporting member 107 among the four corners of the upper surface 106 as illustrated in FIG. 4. In this case, the elastic supporting member 107 is compressed and deformed, and an elastic force corresponding to the amount of deformation is generated. Since the maximum amount of deformation that can be generated is Δh, the maximum value of the elastic force is kΔh [N]. When P represents this maximum value of elastic force, P=kΔh holds. This P acts on the roller 119 and causes the bending deflection.

Next, the bending deflection of the roller 119 is obtained. In the case where a solid round bar having a diameter of D [mm] is used as the roller 119, the moment of inertia of area I [mm⁴] is expressed by the following formula.

$$I = \frac{\pi D^4}{64}$$

Further, when E [MPa] represents the modulus of longitudinal elasticity of the material used for the roller 119, a flexural rigidity EI [N·mm²] of the roller 119 is expressed by the following formula.

$$EI = E\frac{\pi D^4}{64}$$

As illustrated in FIG. 4, the length of the roller 119 is L [mm], and the ends of the roller 119 are rigidly supported. In addition, the distance of the point of action of the elastic force received from the elastic supporting member 107 from the axial center is set as S/2 [mm]. In this case, bending deflection δ [mm] generated in the roller 119 can be expressed by the following formula in accordance with the formula of material mechanics.

$$\delta = \frac{Pa^3b^3}{3EIL^3} = \frac{k\Delta h a^3 b^3}{3EIL^3}$$

To be noted, a [mm] and b [mm] are respectively expressed as follows.

$$a = \frac{L}{2} + \frac{S}{2}$$
$$b = \frac{L}{2} - \frac{S}{2}$$

The following formula is obtained by replacing the δ of the formula above by an allowable value δa thereof and solving the formula for k, and thus the upper limit value of k is defined.

$$k \leq \delta_a \frac{3EIL^3}{\Delta h a^3 b^3}$$

Additive Manufacturing Operation

Next, an additive manufacturing operation for manufacturing a three-dimensionally shaped object on the shaping plate 104 will be described. The three-dimensionally shaped object is formed by repeating a step of laying a layer of powder serving as a raw material and a step of selectively radiating laser light onto and sintering the laid powder layer to form one layer of the three-dimensionally shaped object after completing the operation of adjusting the orientation of the shaping plate described above. That is, after the adjustment process, the controller executes a powder layer formation process in which the controller causes the powder supplying portion to supply the powder and causes the flattening member to perform the scanning movement above the shaping stage to lay the powder layer, and a curing process in which the controller causes the curing portion to selectively cure the powder layer. In the description below, the former will be referred to as a "powder laying step", and the latter will be referred to as a "sintering step".

First, the powder laying step of a first layer is performed.

Figure 5A:
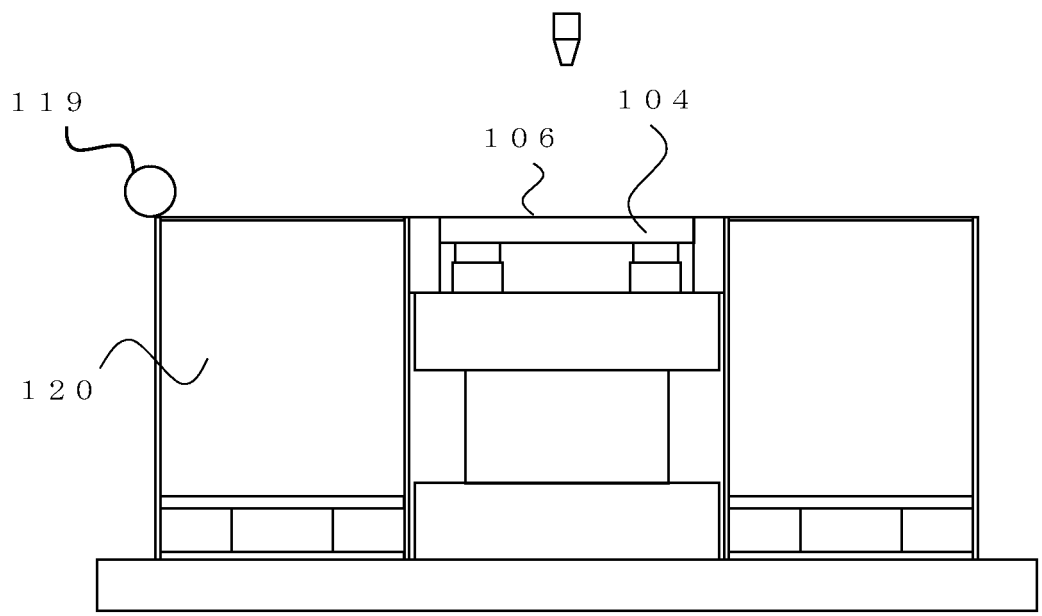
FIG. 5A is a diagram illustrating a state of additive manufacturing according to the first exemplary embodiment.

FIG. 5A illustrates the initial position of each component of the powder bed modeling apparatus 1 at the time when the operation of adjusting the orientation of the shaping plate described above is finished and the powder laying step is started. An operation of placing a predetermined amount of the powder material 120 on the upper surface 106 of the shaping plate 104 is performed by the following procedure.

Figure 5B:
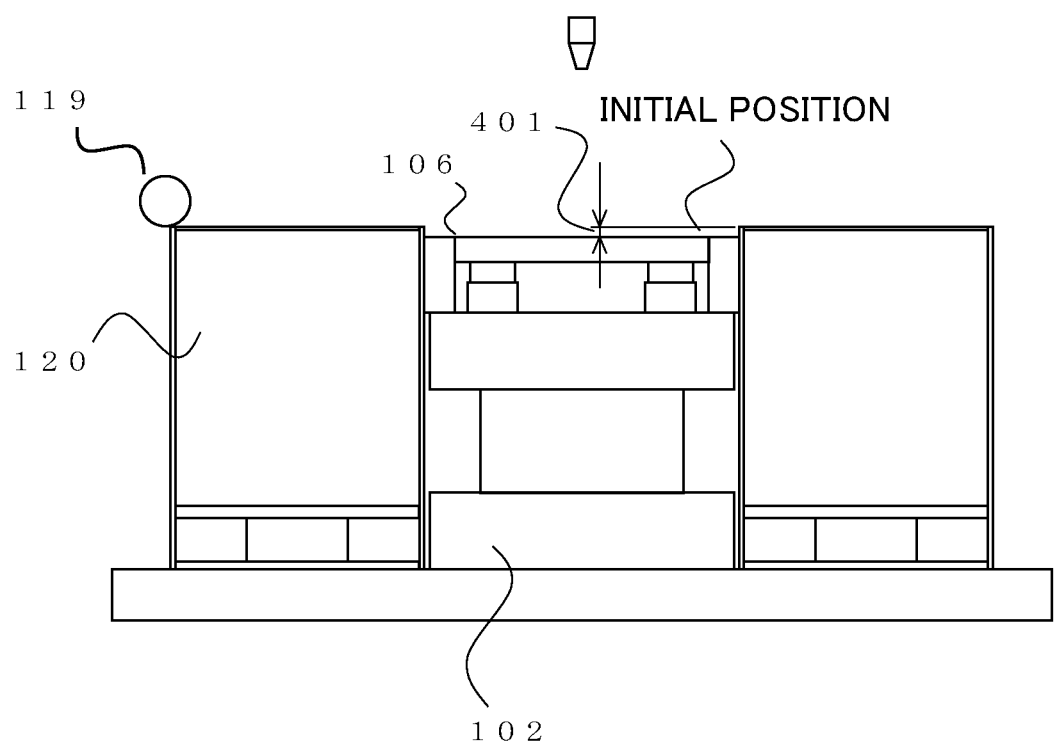
FIG. 5B is a diagram illustrating a state in which the shaping plate is lowered in a powder laying step.

First, as illustrated in FIG. 5B, the controller 15 transmits a control signal to the elevator stand 102 to move the shaping plate 104 such that the upper surface 106 is lowered by a predetermined amount 401. To be noted, the predetermined amount 401 is a distance corresponding to the thickness of one layer of the three-dimensionally shaped object.

Figure 6A:
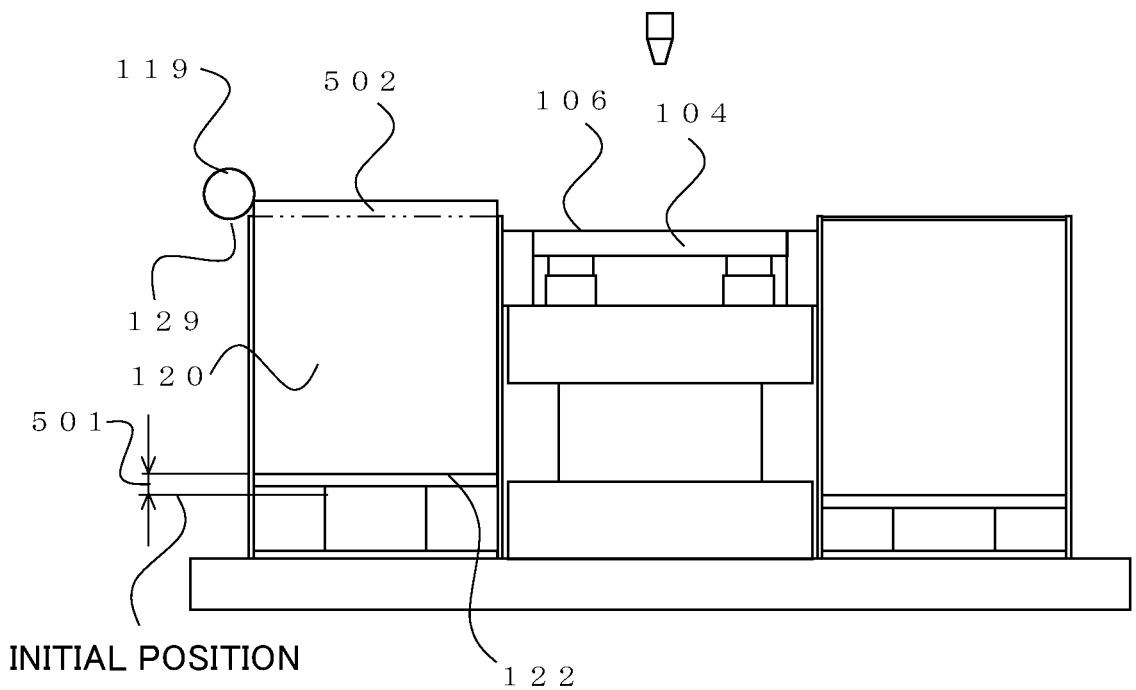
FIG. 6A is a diagram illustrating a state in which one of material elevators is lifted in the powder laying step.

Next, as illustrated in FIG. 6A, the material elevator 122 is lifted by a predetermined amount 501, and thus a required amount 502 of the powder material 120 sufficient for laying one powder layer is moved to a position vertically above a bottom end 129 of the roller 119.

Figure 6B:
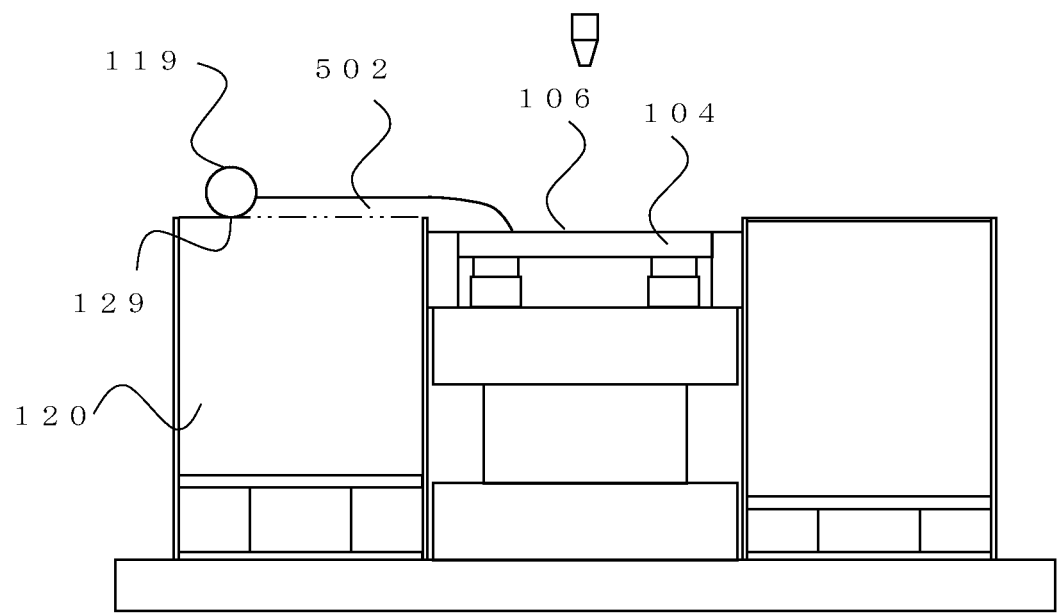
FIG. 6B is a diagram illustrating a state in which a roller is moving in the powder laying step.

Next, as illustrated in FIG. 6B, the roller 119 is moved toward the shaping plate 104. A part of the powder material 120 corresponding to the required amount 502 positioned above the bottom end 129 of the roller 119 is pushed by the roller 119 and moves toward the upper surface 106 of the shaping plate 104.

Figure 7A:
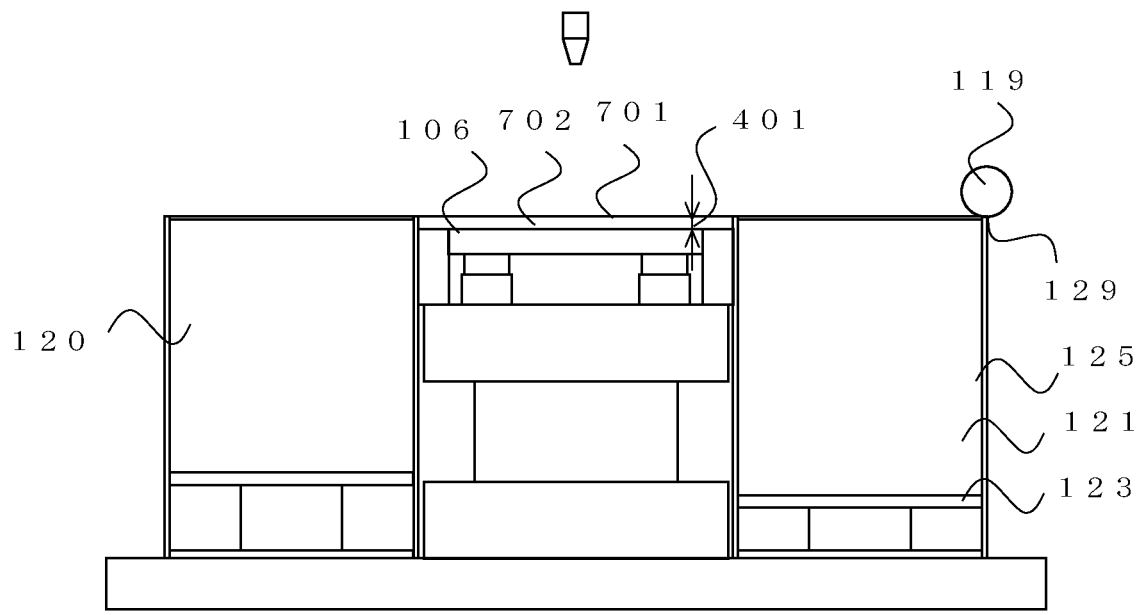
FIG. 7A is a diagram illustrating a state in which the powder laying step of a first layer is completed.

As illustrated in FIG. 7A, the scanning movement of the roller 119 to the right side of FIG. 7A is performed until the roller 119 reaches the end portion 125 of the powder material 121 on the material elevator 123. After the scanning movement is completed, a powder layer 702 is formed on the upper surface 106 of the shaping plate 104. A surface 701 of the powder layer 702 is flattened by the bottom end 129 of the roller 119, and therefore has high flatness.

As has been already described, the upper surface 106 of the shaping plate 104 is adjusted by the operation for adjusting the orientation of the shaping plate 104 to be parallel to the movement trajectory of the bottom end 129 of the roller 119, the surface 701 of the powder layer 702 and the upper surface 106 of the shaping plate 104 have an extremely high degree of parallel. That is, the thickness of the powder layer 702 is extremely uniform in the entirety of the upper surface 106 of the shaping plate 104.

To be noted, the required amount 502 of the powder material 120 sufficient for one layer is moved to the right of FIG. 7A by the roller 119, and excessive powder not deposited on the upper surface 106 as the powder layer 702 is moved onto the material elevator 123 and mixed with the powder material 121. That is all for the powder laying step for the first layer.

To be noted, although the powder laying step for the first layer is performed by using the powder material on the material elevator 122 in the description above, the powder bed modeling apparatus 1 of the present exemplary embodiment includes a material elevator storing a powder material on each of the right side and left side of the shaping plate 104. Therefore, the powder laying step for the first layer may be performed by using the powder material on the material elevator 122 as in the example described above, or may be performed by using the powder material on the material elevator 123. In the latter case, the roller 119 may be moved in a scanning manner from the right side to the left side in FIG. 7A to form the powder layer.

After the powder laying step for the first layer is finished, next, a sintering step for the first powder layer is performed. This is a step of radiating an energy beam onto a region in the laid powder layer 702 corresponding to the shape of the first layer of the three-dimensionally shaped object to be manufactured to heat the region and thus sintering the powder. This is performed by radiating the energy beam on the basis of slice data generated from three-dimensional shape data of a three-dimensional model of the three-dimensionally shaped object to be manufactured.

Figure 7B:
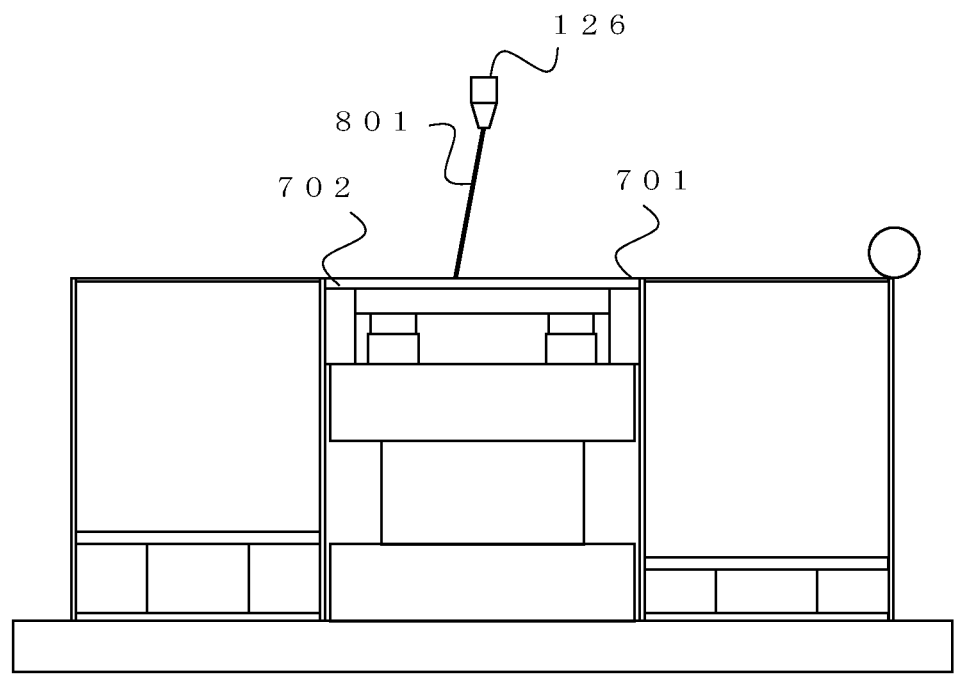
FIG. 7B is a diagram illustrating a state in which laser light is radiated onto a powder material in a sintering step.

As illustrated in FIG. 7B, the laser emission apparatus 126 selectively radiates laser light 801 onto a region where the three-dimensionally shaped object is to be formed on the surface 701 of the powder layer 702. The part of the powder layer 702 where the laser light 801 is radiated is heated to a high temperature and thus sintered, and the part where the laser light 801 is not radiated remains in a powder state. As described above, the first layer of the three-dimensionally shaped object is formed.

Figure 8:
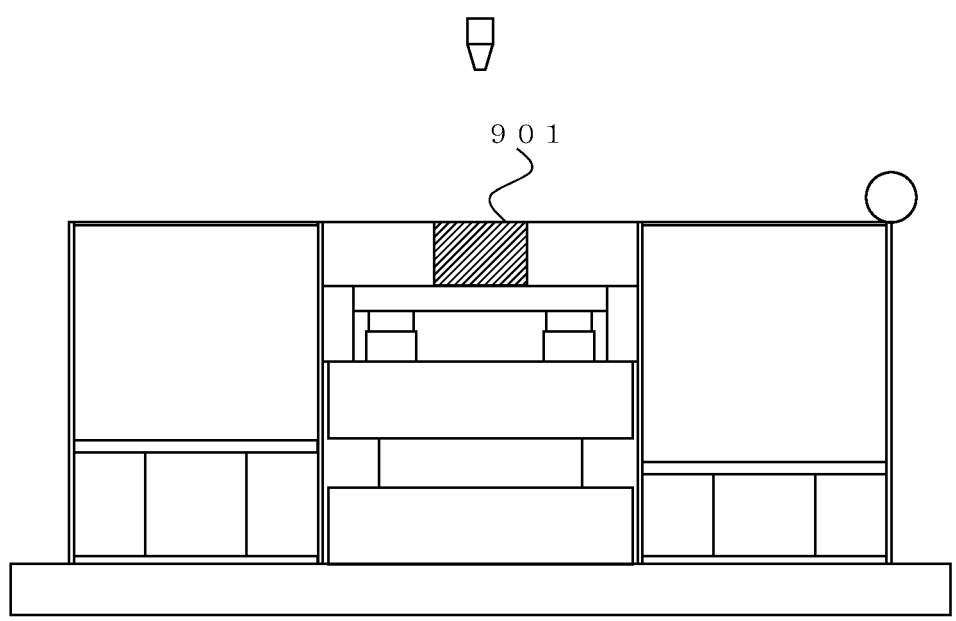
FIG. 8 is a diagram illustrating a state in which a three-dimensionally shaped object is formed.

A three-dimensionally shaped object 901 can be obtained as illustrated in FIG. 8 by subsequently depositing and forming sintered portions of the second and subsequent layers by repeating the powder laying step and the sintering step in accordance with the shape of the three-dimensionally shaped object to be manufactured.

As described above, when laying the first layer of the powder material, the height of the shaping plate 104 is adjusted by the elevator stand 102 such that the upper surface 106 of the shaping plate 104 is lower than the bottom end of the roller 119. In other words, the bottom end of the roller 119 moves parallel to the upper surface 106 while maintaining a position higher than the upper surface 106 of the shaping plate 104. As a result of this, a powder layer having a thickness corresponding to the distance between the bottom end of the roller 119 and the upper surface 106 of the shaping plate 104 is laid.

In addition, when laying the second and subsequent layers, the height of the shaping plate 104 is adjusted by the elevator stand 102 such that the upper surface of the powder layer laid by the previous scanning movement is lower than the bottom end of the roller 119. In other words, when laying the second and subsequent layers of powder material, the bottom end of the roller 119 moves parallel to the upper surface 106 of the shaping plate 104 while maintaining a position higher than the upper surface of the powder layer laid previously. As a result of this, a powder layer having a thickness corresponding to the distance between the bottom end of the roller 119 and the upper surface of the powder layer laid previously is newly laid on the powder layer laid previously.

According to the present exemplary embodiment, since the powder layer is laid in a state in which the uniformity of the thickness thereof is extremely high for the entirety of the upper surface of the shaping plate, a sintered object of the same quality can be manufactured with a high shape precision by heating any part of the layer by laser light. Since a sintered object having a predetermined strength can be formed also as the first layer serving as the base portion of the three-dimensionally shaped object with a high shape precision, formation of upper layers that is subsequently performed can be stably proceeded.

When mass-producing the three-dimensionally shaped object, although the shaping plate is replaced each time of manufacture and the roller is caused to perform the scanning movement, according to the present exemplary embodiment, the degree of parallel between the upper surface of the shaping plate and the plane drawn by the scanning trajectory of the bottom end of the roller can be automatically adjusted. Therefore, even when there is an individual difference of the shaping plate or there is a difference in the attached orientation of the shaping plate, a three-dimensionally shaped object of high quality can be stably mass-produced. In addition, even in the case where the operation of the scanning mechanism is deviated from the initial setting due to change in the environmental conditions such as temperature or the apparatus conditions while mass-producing the three-dimensionally shaped object, the mass-production can be stably performed. The roller does not contact the upper surface of the shaping plate to stop or damage the apparatus during the scanning movement for forming the powder layer.

Second Exemplary Embodiment

Configuration of Additive Manufacturing Apparatus

Although a powder bed modeling apparatus of a system in which a layer of metal powder is laid and is sintered by the energy of laser light will be described as an example of an additive manufacturing apparatus according to a second exemplary embodiment, the application of the present invention is not limited to this system.

In the first exemplary embodiment, the inclination of the shaping surface with respect to the movement trajectory of the bottom end of the roller 119 is detected, or measured by using the length meters 115 to 118 supporting the shaping plate 104. In contrast, in the second exemplary embodiment, an angle detector is provided in a mechanism supporting the roller, and the inclination of the shaping surface with respect to the movement trajectory of the bottom end of the roller is detected, or measured by using the angle detector.

Figure 9A:
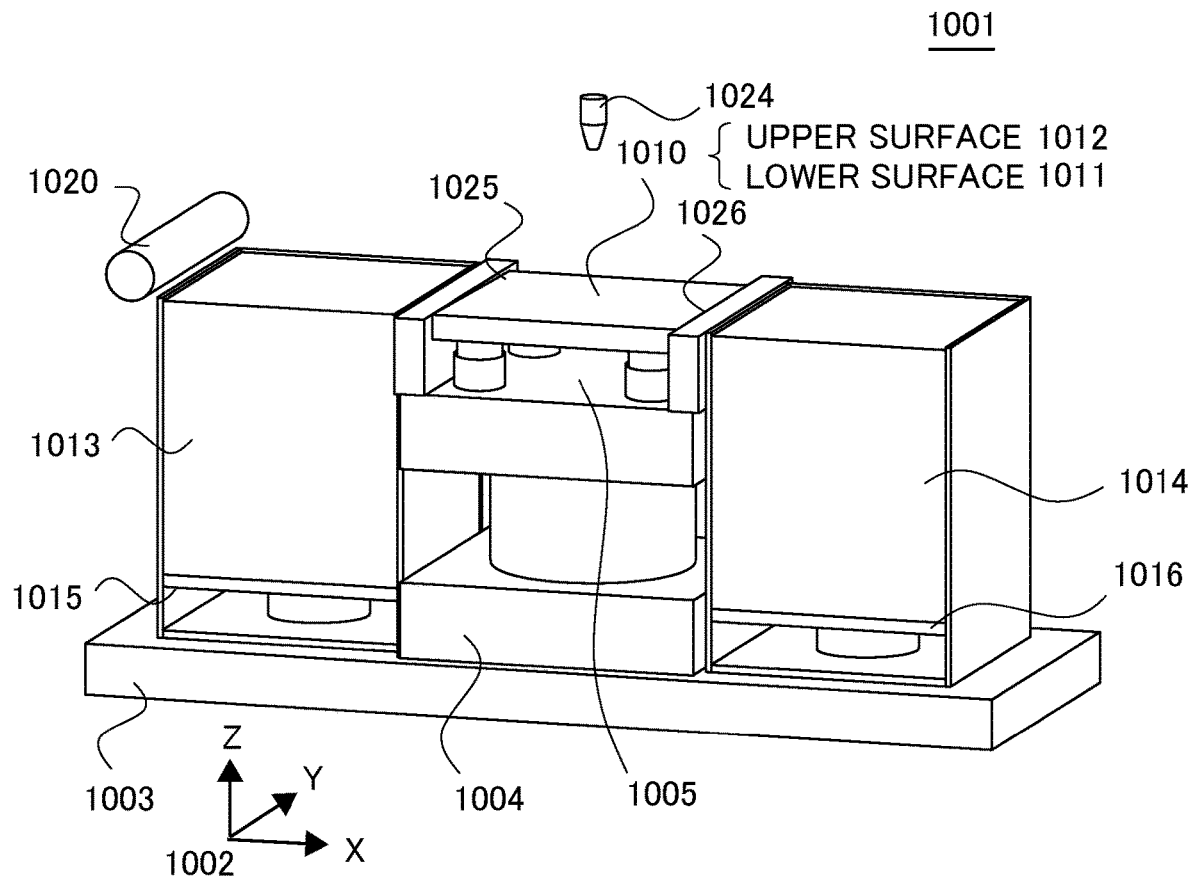
FIG. 9A is a perspective view of an additive manufacturing apparatus according to a second exemplary embodiment illustrating a configuration thereof.

FIG. 9A is a schematic perspective view of the additive manufacturing apparatus according to the second exemplary embodiment illustrating a schematic configuration thereof. A powder bed modeling apparatus 1001 includes a platform portion 1003 serving as a base portion in contact with a floor surface, and an elevator stand 1004 and material elevators 1015 and 1016 are provided on the platform portion 1003.

An upper surface 1005 of the elevator stand 1004 is kept horizontal, and can be moved up and down along the vertical direction by an unillustrated driving mechanism. To be noted, the terms "horizontal" and "vertical direction" used herein are not so strict as to not allow even a minute error.

To be noted, in the description below, an X-Y-Z rectangular coordinate system 1002 will be sometimes used for indicating a direction. For the sake of convenience of description, the Z direction is set as the vertical direction, and the X direction and the Y direction are set to define the horizontal plane. The powder bed modeling apparatus 1001 is disposed such that the left-right direction thereof is along the X direction, and the front-rear direction thereof is along the Y direction.

Figure 9B:
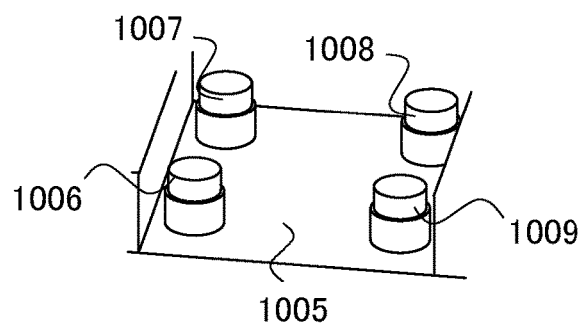
FIG. 9B is an enlarged view of a mechanism that supports a shaping plate according to the second exemplary embodiment.

Adjusters 1006, 1007, 1008, and 1009 are fixed to the upper surface 1005 of the elevator stand 1004, and a shaping plate 1010 is disposed on the adjusters 1006 to 1009. Here, the lower surface of the shaping plate 1010 will be denoted by 1011, and the upper surface of the shaping plate 1010 will be denoted by 1012. FIG. 9B illustrates a layout relationship between the upper surface 1005 of the elevator stand 1004 and the adjusters 1006 to 1009. The adjusters 1006 to 1009 are each independently capable of expanding and contracting in the Z direction, and the inclination angle of the upper surface 1012 of the shaping plate 1010 can be adjusted by the expanding/contracting operation.

The configuration and operation of the material elevators 1015 and 1016 are the same as those of the material elevators 122 and 123 of the first exemplary embodiment. The material elevators 1015 and 1016 respectively store powder materials 1013 and 1014 serving as raw materials for the additive manufacturing. In addition, a laser emission apparatus 1024 that selectively heats a powder material disposed on the shaping plate 1010 to sinter the powder material at a high temperature is provided as a curing portion. The configuration and operation of the laser emission apparatus 1024 are the same as those of the laser emission apparatus 126 of the first exemplary embodiment.

The powder bed modeling apparatus 1001 includes a roller 1020 for laying a layer of a powder material serving as a raw material of the three-dimensionally shaped object on the shaping plate 1010 and flattening the upper surface of the layer. The roller 1020 is capable of reciprocating above the shaping plate 1010 in the horizontal direction by a driving mechanism not illustrated in FIG. 9A while maintaining the position in the Z direction constant. To be noted, the horizontal direction mentioned herein is not so strict as to not allow even a minute error.

Figure 10:
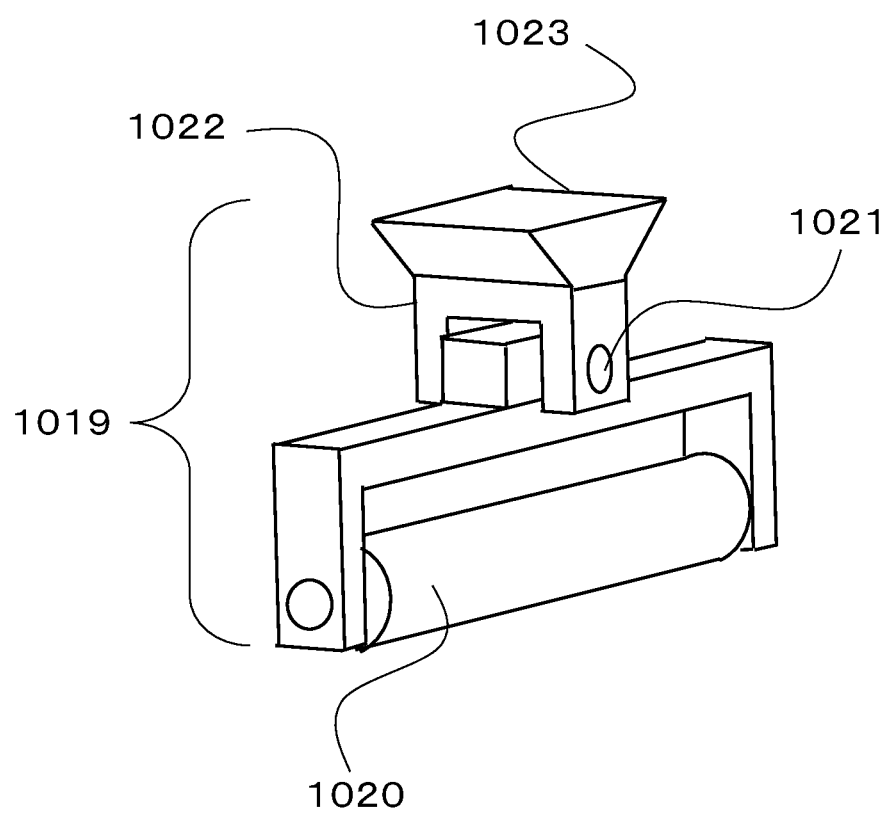
FIG. 10 is a perspective view of a roller unit according to the second exemplary embodiment.

As illustrated in FIG. 10, the roller 1020 is incorporated in a roller unit 1019. The roller unit 1019 includes a swing shaft 1021, an angle meter 1022, and a load meter 1023 in addition to the roller 1020. The rotation axis of the roller 1020 having a columnar or tubular shape is the center axis of the columnar or tubular shape. When a layer of powder material is laid while the roller unit 1019 moves horizontally in the X direction, the rotation axis of the roller 1020 is kept approximately parallel to the Y direction, and the roller 1020 is rotatable about the rotation axis.

The swing shaft 1021 is a rotation shaft extending along the X direction, and supports the roller 1020 such that the roller 1020 is rotatable or swingable about the X axis. As will be described later, when detecting or measuring the inclination of the upper surface 1012 of the shaping plate 1010 serving as the shaping surface with respect to the movement trajectory of the bottom end of the roller 1020, the roller 1020 is supported by the swing shaft 1021 so as to be rotatable about the X axis. In contrast, when laying a layer of powder material, for example, the roller 1020 is fixed to the swing shaft 1021 so as not to be rotatable about the X axis by an unillustrated stopper, and thus the rotation axis of the roller 1020 is kept approximately parallel to the Y direction.

The angle meter 1022 is used for detecting or measuring the inclination of the upper surface 1012 of the shaping plate 1010 serving as a shaping surface with respect to the movement trajectory of the bottom end of the roller 1020, and is capable of measuring the amount of inclination of the rotation axis of the roller 1020 about the X axis with respect to the Y direction. For example, a rotary encoder can be used as the angle meter 1022.

The load meter 1023 is used for detecting or measuring the inclination of the upper surface 1012 of the shaping plate 1010 serving as a shaping surface with respect to the movement trajectory of the bottom end of the roller 1020, and is capable of measuring a reaction force transmitted from the shaping plate 1010 to the roller 1020 when a load is applied from the roller 1020 to the shaping plate 1010. For example, a strain gauge load cell, an electrostatic capacitance load cell, or the like can be used as the load meter 1023.

Operation for Adjusting Orientation of Shaping Plate

When the shaping plate 1010 is attached to the powder bed modeling apparatus 1001, the powder bed modeling apparatus 1001 measures whether or not the upper surface 1012 of the shaping plate 1010 is inclined with respect to the movement trajectory of the bottom end of the roller 1020 before laying a layer of the powder material. That is, the controller executes a measuring process of detecting or measuring the inclination between the shaping surface and the trajectory plane of the scan by the flattening member.

As a result of the measurement, in the case where it has been found that the shaping surface is inclined with respect to the movement trajectory of the bottom end of the roller 1020, the powder bed modeling apparatus 1001 adjusts the orientation of the shaping plate 1010 such that these two become parallel. That is, the controller executes, on the basis of the measurement results of a measuring process, an adjustment process of adjusting the orientation of the shaping stage by operating the adjusters 1006 to 1009 such that the degree of parallel between the shaping surface and the trajectory plane of the scanning movement of the flattening member increases. In other words, the controller executes an adjustment process of making adjustment such that the angle difference between the shaping surface and the trajectory plane of the scanning movement of the flattening member decreases.

Figure 11:
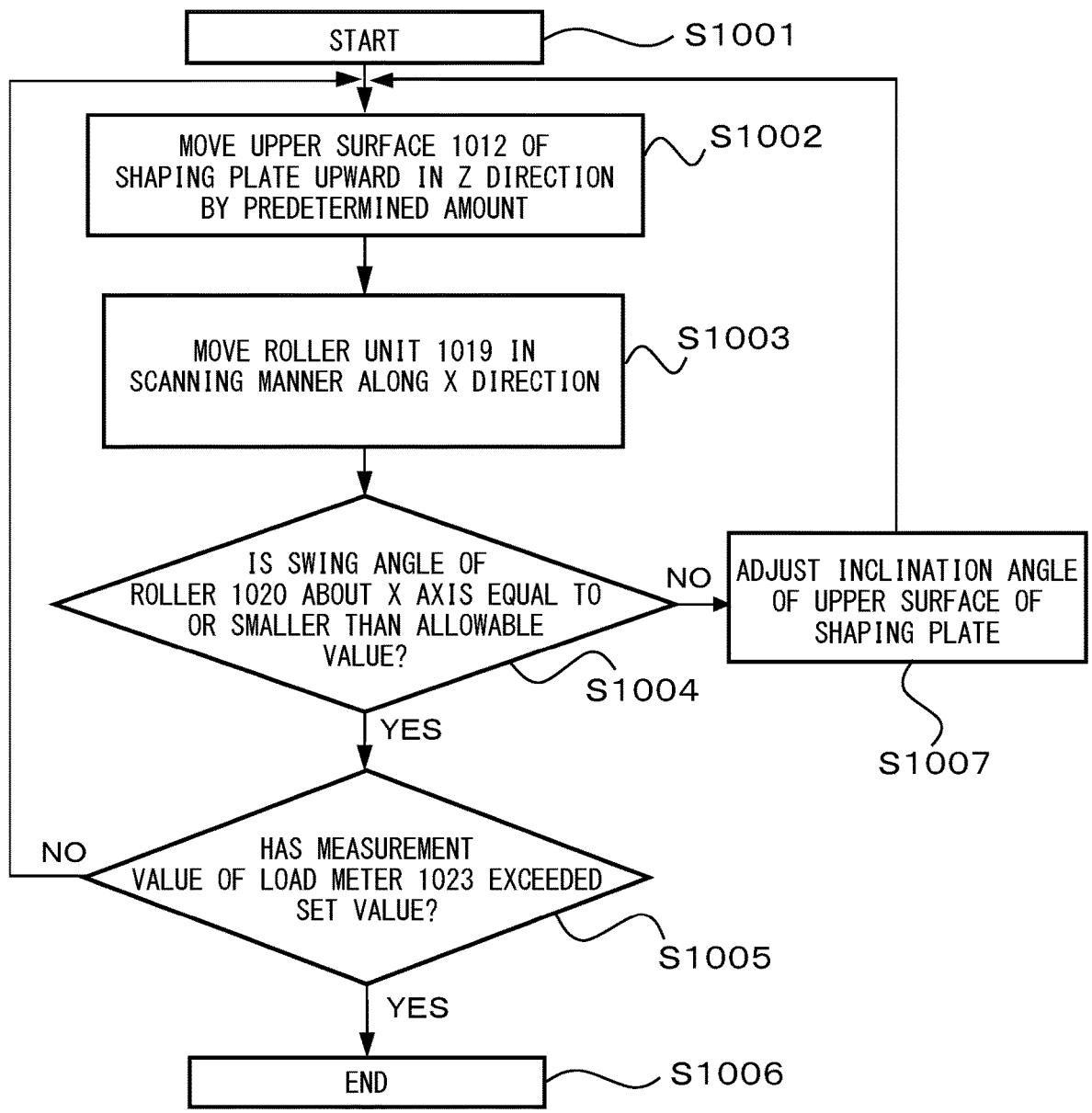
FIG. 11 is a flowchart of an adjustment operation of an inclination angle according to the second exemplary embodiment.
Figure 12:
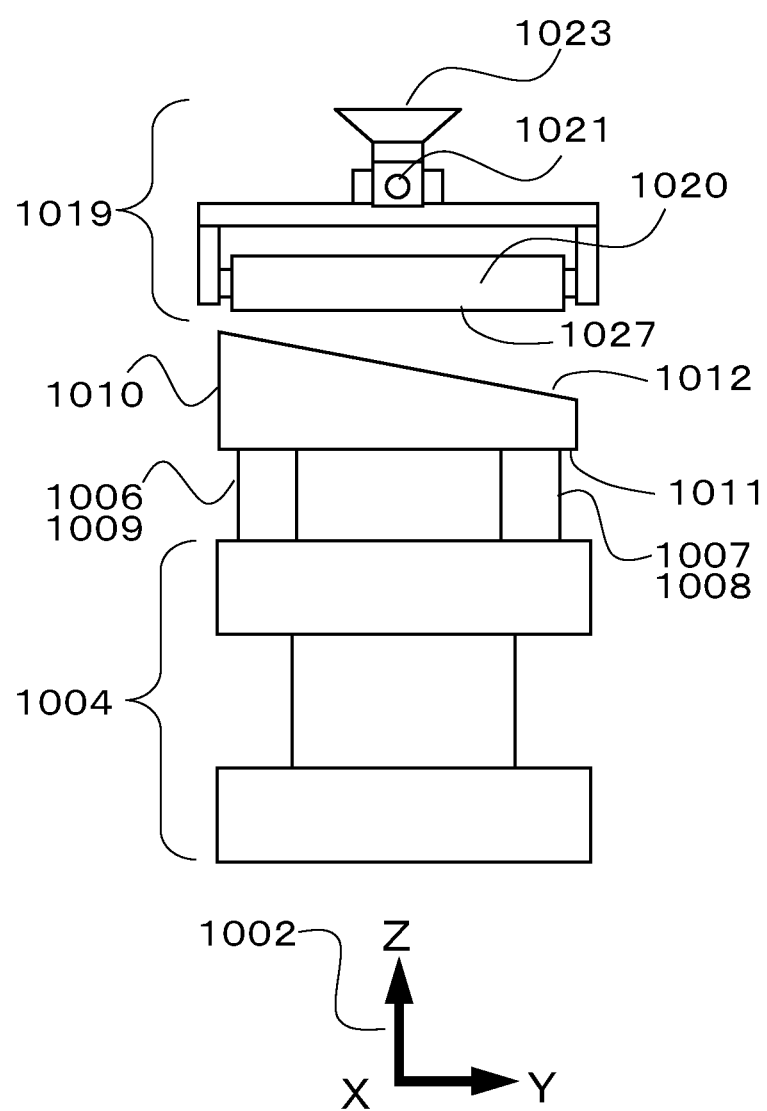
FIG. 12 is a diagram illustrating an example of one state of the adjustment operation of the inclination angle according to the second exemplary embodiment.
Figure 13:
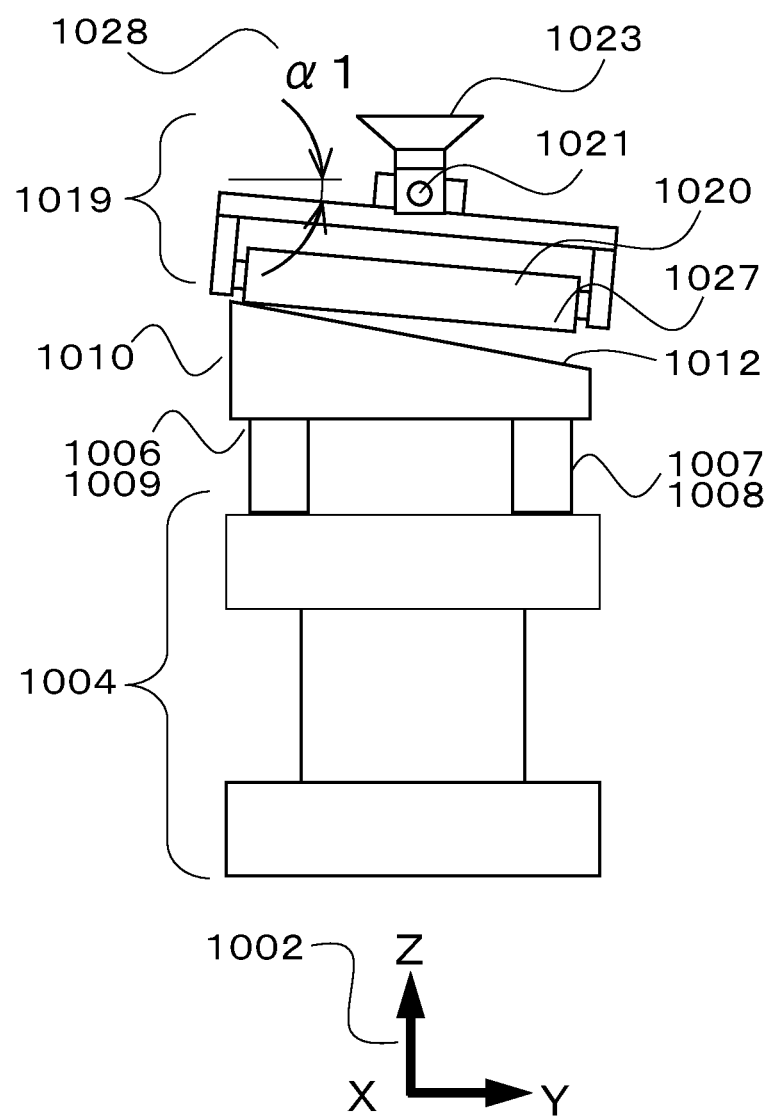
FIG. 13 is a diagram illustrating an example of another state of the adjustment operation of the inclination angle according to the second exemplary embodiment.
Figure 14:
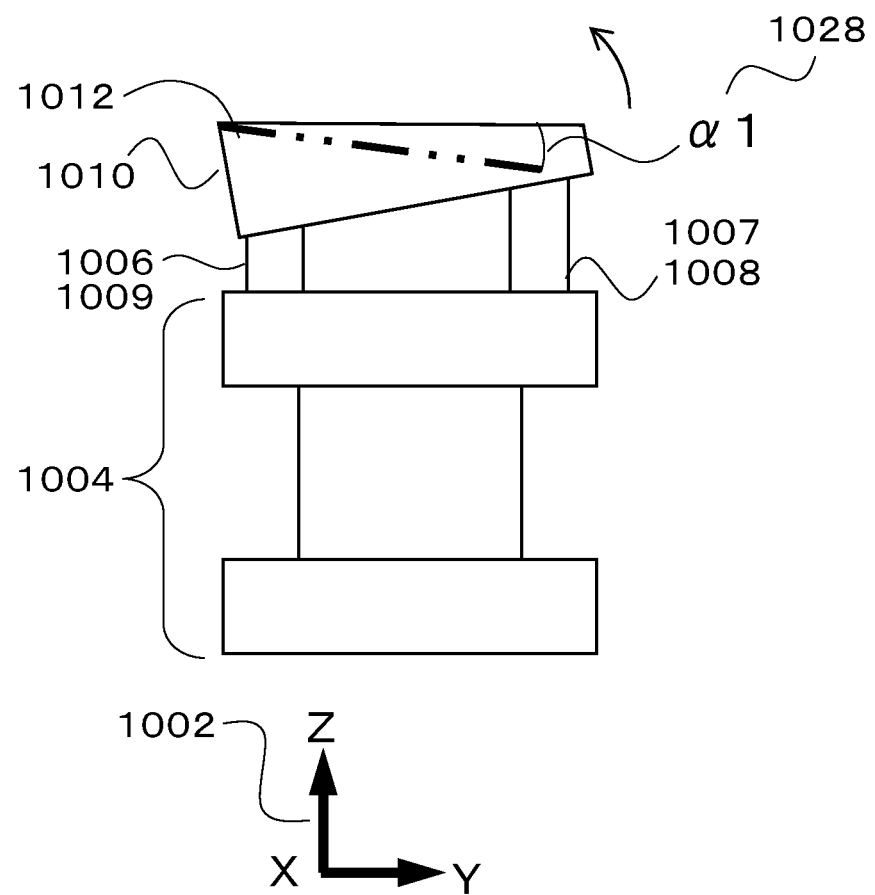
FIG. 14 is a diagram illustrating an example of yet another state of the adjustment operation of the inclination angle according to the second exemplary embodiment.

FIG. 11 is a flowchart for describing a processing procedure of adjusting the orientation of the shaping plate. In addition, FIGS. 12 to 14 are side views of the powder bed modeling apparatus 1001 as viewed in the X direction. To be noted, FIGS. 12 to 14 are schematically illustrated for the sake of convenience of description, and for example, the angle of the roller 1020 and the angle of the upper surface 1012 of the shaping plate 1010 are illustrated in a manner exaggerated to some extent.

The processing is started in step S1001 of FIG. 11, and in second step S1002, the driving mechanism of the elevator stand 1004 is operated to move the upper surface 1012 of the shaping plate 1010 upward in the Z direction by a predetermined amount.

Next, in step S1003, the roller unit 1019 is moved in a scanning manner in a region at least including a range from a first end portion 1025 to a second end portion 1026 of the upper surface 1012 in the X direction. At this time, the roller 1020 is supported by the swing shaft 1021 to be rotatable or swingable about the X axis.

Next, in step S1004, whether or not the swing angle of the roller 1020 about the X axis during the scanning movement of step S1003 is equal to or smaller than an allowable value is determined.

FIG. 12 illustrates a state in which the upper surface 1012 of the shaping plate 1010 is not in contact with a bottom line 1027 of the roller 1020. In the state of this diagram, since the center axis of the roller 1020 is maintained parallel to the Y axis and the roller 1020 does not swing about the X axis, the swing angle measured by the angle meter 1022 is zero.

In contrast, FIG. 13 illustrates an example of a state in which the upper surface 1012 of the shaping plate 1010 is not horizontal and the bottom line 1027 of the roller 1020 is in contact with the upper surface 1012. In the state illustrated in FIG. 13, the roller 1020 rotates about the X axis around the swing shaft 1021 due to the contact. In the example of FIG. 13, it is assumed that a swing angle 1028 measured by the angle meter 1022 is α1 [deg].

In step S1004, to restrict the degree of deviation from parallel between the upper surface 1012 of the shaping plate 1010 and the movement trajectory of the bottom end of the roller 1020 at the time of laying powder, an appropriate value is set as a predetermined allowable value. In other words, the allowable value is set as a threshold value for suppressing the non-uniformity of the thickness of the powder material layer within a predetermined range. The allowable value may be set to an angle at which the difference between positions of the four corners of the shaping surface of the shaping plate 1010 in the gravity direction is equal to or smaller than 30 μm. For example, in the case where the size of the shaping plate 1010 is 250 mm×250 mm, the allowable value may be set to 0.007 [deg]. It can be said that the inclination of the upper surface 1012 of the shaping plate 1010 with respect to the X-Y plane or horizontal plane that is the movement trajectory of the bottom end of the roller 1020 at the time of laying powder is within the allowable range when the swing angle 1028 is equal to or smaller than the allowable value. Conversely, in the case where the swing angle 1028 is larger than the predetermined allowable value, the non-uniformity of the thickness of powder material layer cannot be suppressed within a predetermined range.

Therefore, in the case where it is determined in step S1004 that the swing angle 1028 is larger than a predetermined allowable value, that is, in the case where the result of step S1004 is NO, the process proceeds to step S1007. In step S1007, the orientation of the upper surface 1012 of the shaping plate 1010 is adjusted in accordance with al [deg] measured by the angle meter 1022 as the swing angle 1028. That is, the controller drives the adjusters 1006 to 1009 such that the upper surface 1012 becomes closer to the X-Y plane or horizontal plane that is the movement trajectory of the bottom end of the roller 1020 at the time of laying powder. For example, in the case where α1 [deg] illustrated in FIG. 13 is measured as the swing angle 1028 and α1 [deg]>allowable value is satisfied, the controller independently controls each of the adjusters 1006 to 1009 to contract, and thus causes the upper surface 1012 to rotate in a counterclockwise direction of FIG. 14 by al [deg] as illustrated in FIG. 14. As a result of this operation, the upper surface 1012 of the shaping plate 1010 becomes closer to the X-Y plane or horizontal plane that is the movement trajectory of the bottom end of the roller 1020 at the time of laying powder, by an amount corresponding to the swing angle 1028 measured in step S1004.

After the inclination angle of the upper surface 1012 of the shaping plate 1010 is adjusted in step S1007, the process returns to step S1002 to move the upper surface 1012 upward in the Z direction, and step S1003 and subsequent steps are repeated.

In addition, in the case where it is determined in step S1004 that the swing angle 1028 is equal to or smaller than the predetermined allowable value, that is, in the case where the result of step S1004 is Yes, the process proceeds to step S1005. In step S1005, whether or not the value of load measured by the load meter 1023 of the roller unit 1019 has exceeded a predetermined set value for the entirety of the scanning range of step S1003 is determined. To determine whether or not the roller 1020 is in contact with the upper surface 1012 of the shaping plate 1010 in the entirety of the roller 1020 in the longitudinal direction, an appropriate value is set as the predetermined set value. In other words, in the state illustrated in FIG. 12 or 13, the value of the load measured by the load meter 1023 does not exceed the predetermined set value.

In the case where it is determined in step S1005 that the measured value of load does not exceed the set value, that is, in the case where the result of step S1005 is NO, a state in which the upper surface 1012 of the shaping plate 1010 and the bottom line 1027 of the roller 1020 are in contact with each other with no gap therebetween is not achieved. That is, the state illustrated in FIG. 12 or 13 is taken. In this case, it is not guaranteed that the inclination of the upper surface 1012 with respect to the X-Y plane or horizontal plane that is the movement trajectory of the bottom end of the roller 1020 at the time of laying powder is within the allowable range even if the swing angle 1028 is equal to or smaller than the predetermined allowable value in step S1004.

Therefore, in the case where it is determined that the measured value of the load does not exceed the set value, that is, in the case where the result of step S1005 is NO, the process returns to step S1002 to move the shaping plate 1010 upward in the Z direction, and then steps S1003 and S1004 are repeated.

In contrast, in the case where it is determined in step S1005 that the measured value of load exceeds the set value, that is, in the case where the result of step S1005 is YES, the operation for adjusting the orientation of the shaping plate is finished. This is because the inclination of the upper surface 1012 with respect to the X-Y plane or horizontal plane that is the movement trajectory of the bottom end of the roller 1020 at the time of laying powder is within the allowable range for the entirety of the scanning range.

After adjusting the inclination angle of the upper surface 1012 of the shaping plate 1010 according to the procedure described above, the orientation of the roller 1020 is returned such that the rotation axis thereof is parallel to the Y direction, and the roller 1020 is fixed to the swing shaft 1021 by an unillustrated stopper such that the roller 1020 cannot rotate about the X axis. Then, the additive manufacturing operation similar to the first exemplary embodiment is performed to manufacture a three-dimensionally shaped object.

Also in the present exemplary embodiment, since the powder layer is laid in a state in which the uniformity of the thickness thereof is extremely high for the entirety of the upper surface of the shaping plate, a sintered object of the same quality can be manufactured with a high shape precision by heating any part of the layer by laser light. Since a sintered object having a predetermined strength can be formed also as the first layer serving as the base portion of the three-dimensionally shaped object with a high shape precision, formation of upper layers that is subsequently performed can be stably proceeded.

When mass-producing the three-dimensionally shaped object, although the shaping plate is replaced each time of manufacture and the roller is caused to perform the scanning movement, according to the present exemplary embodiment, the degree of parallel between the upper surface of the shaping plate and the plane drawn by the scanning trajectory of the bottom end of the roller can be automatically adjusted. Therefore, even when there is an individual difference of the shaping plate or there is a difference in the attached orientation of the shaping plate, a three-dimensionally shaped object of high quality can be stably mass-produced. In addition, even in the case where the operation of the scanning mechanism is deviated from the initial setting due to change in the environmental conditions such as temperature or the apparatus conditions while mass-producing the three-dimensionally shaped object, the mass-production can be stably performed. The roller does not contact the upper surface of the shaping plate to stop or damage the apparatus during the scanning movement for forming the powder layer.

Other Embodiments

The present invention is not limited to the exemplary embodiments described above, and can be modified in many ways within the technical concept of the present invention.

For example, although a laser light source is used as a light source for heating the laid raw material powder in the exemplary embodiments described above, the light used herein does not have to be laser light as long as the irradiation energy density of the light can be controlled and scan can be performed with the radiated light. For example, an irradiation optical system obtained by combining optical elements such as a high luminance lamp, a shutter, a variable focus lens, and a scanning mirror can be used as the light source. Further, an energy beam or the like may be used instead of a light beam as long as the energy beam can selectively irradiate the raw material powder layer, and an appropriate energy beam can be used.

In addition, the three-dimensionally shaped object may be formed by selectively spraying a curing agent onto a part of the powder layer and inducing a chemical reaction to cure the powder layer instead of by curing the powder layer by heating the powder layer to cause fusion/solidification or sintering.

In addition, the raw material powder is not limited to metal powder, and resin powder such as acrylonitrile-butadiene styrene resin: ABS or polyether ether ketone resin: PEEK may be used.

Further, the flattening member is not limited to a roller, and the flattening member may be a squeegee or a blade as long as the member can be moved in a scanning manner above the shaping stage.

In addition, laying the powder layer and flattening the surface does not have to be simultaneously achieved in one cycle of scanning movement by the flattening member. For example, the upper surface of the powder layer may be flattened by causing the flattening member to perform the scanning movement after laying the powder layer by spraying powder onto the shaping stage from above.

In addition, the measurement of the change in the length of the elastic supporting members in the vertical direction due to elastic deformation does not have to be performed by the length meters that the elastic supporting members themselves are provided with. As long as a device capable of measuring the change in the length is used, the device does not have to be added to the elastic supporting members themselves. In addition, displacement of the shaping plate at positions where the elastic supporting members support the shaping plate may be measured instead of measuring the change in the length of the elastic supporting members.

In addition, although the shaping plate is detachably supported on the upper surface of the elevator stand via adjusters and elastic supporting members in FIG. 1, how the shaping plate is mounted is not limited to this. For example, a base may be placed on the upper surface of the elevator stand via adjusters and elastic supporting members, and the shaping plate may be mounted on the base. In this case, when adjusting the degree of parallel between the upper surface of the shaping plate and the plane drawn by the scanning trajectory of the bottom end of the roller, the orientation of the base is changed by operating the adjusters, and thus the orientation of the mounted shaping plate is also adjusted in accordance with the base.

The present invention may be realized by supplying a program that realizes one or more functions of the exemplary embodiments described above to a system or an apparatus via a network or a recording medium and reading and executing the program by one or more processors in a computer of the system or the apparatus. In addition, the present invention may be realized by a circuit that realizes the one or more functions, for example, an application specific integrated circuit: ASIC.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-93109, filed May 16, 2019, and Japanese Patent Application No. 2020-72235, filed Apr. 14, 2020, which are hereby incorporated by reference herein in their entirety.

What is claimed is:

1. An additive manufacturing apparatus comprising:
   a first portion comprising an elevator stand and configured to support a shaping stage in a first direction;
   a member configured to flatten a powder layer laid on the shaping stage by moving in a scanning manner above the shaping stage in a second direction, the member configured to flatten being a flattener, the member having a bottom end extending in a third direction intersecting the second direction;
   a second portion configured to selectively heat and/or cure the powder layer laid on the shaping stage; and
   a controller,
   wherein the controller is configured to execute:
   a measuring process of detecting an inclination between the shaping stage and the bottom end of the member in the first and third directions;
   an adjustment process of adjusting a positional relationship between the shaping stage and the member on a basis of a detection result of the measuring process;
   a formation process of causing the member to perform a scanning movement above the shaping stage to flatten the powder layer after the adjustment process; and
   a process of causing the second portion to selectively heat and/or cure the powder layer.

2. The additive manufacturing apparatus according to claim 1, wherein the measuring process is a process in which the scanning movement is performed while the member is in contact with the shaping stage, and displacement of the first portion is measured.

3. The additive manufacturing apparatus according to claim 1, wherein the first portion comprises:
   a supporter that is elastically deformable;
   a meter configured to measure an amount of elastic deformation of the supporter; and
   an adjuster having an adjustable length,
   wherein the supporter is arranged between the elevator stand and the shaping stage, the meter is configured to be used in the measuring process, and the adjuster is configured to be used in the adjustment process.

4. The additive manufacturing apparatus according to claim 3, wherein in the measuring process, a local maximum of the amount of elastic deformation of the supporter during the scanning movement of the member is measured, and
   wherein in the adjustment process, the length of the first portion is adjusted on a basis of the measured local maximum.

5. The additive manufacturing apparatus according to claim 1, wherein the measuring process is a process in which the scanning movement is performed while the member is in contact with the shaping stage and thus an angle of the member is measured.

6. The additive manufacturing apparatus according to claim 1, wherein the first portion comprises an adjuster having an adjustable length,
   wherein the member comprises an angle detection portion,
   wherein the measuring process comprises measuring an angle of the member, and
   wherein the adjustment process comprises adjusting a length of the first portion by the adjuster.

7. The additive manufacturing apparatus according to claim 1, wherein the second portion comprises an energy beam source configured to radiate an energy beam.

8. The additive manufacturing apparatus according to claim 1, wherein the shaping stage is detachable from the first portion.

9. The additive manufacturing apparatus according to claim 1, wherein the adjustment process is performed so that the shaping stage becomes more parallel with respect to a trajectory plane of a scanning movement of the member, the trajectory plane being defined by a trajectory of the bottom end by the scanning movement of the member.

10. The additive manufacturing apparatus according to claim 1, further comprising a powder supplying portion configured to supply powder.

11. The additive manufacturing apparatus according to claim 1, wherein the controller is configured to execute the measuring process when the additive manufacturing apparatus stores a powder material to form the powder layer.

12. A method for manufacturing a product by using the additive manufacturing apparatus according to claim 1, comprising providing the controller with shape data of a three-dimensionally shaped object.

* * * * *